(12) United States Patent
Glazier

(10) Patent No.: US 7,436,460 B2
(45) Date of Patent: Oct. 14, 2008

(54) EASY-TO-FIND REMOTE CONTROL FOR TELEVISION OR OTHER DEVICES

(76) Inventor: Jordan Willard Hawkwood Glazier, 3202 Rowland Pl. NW., Washington, DC (US) 20008

( * ) Notice: Subject to any disclaimer, the term of this patent is extended or adjusted under 35 U.S.C. 154(b) by 496 days.

(21) Appl. No.: 10/820,044

(22) Filed: Apr. 8, 2004

(65) Prior Publication Data

US 2005/0225682 A1    Oct. 13, 2005

(51) Int. Cl.
*H04N 5/44*    (2006.01)

(52) U.S. Cl. .................................. 348/734; 340/825.69

(58) Field of Classification Search .............. 348/734, 348/725, 552; 340/825.36, 539.32, 825.49, 340/825.72, 825.44, 825.69, 572; *H04N 5/44*
See application file for complete search history.

(56) References Cited

U.S. PATENT DOCUMENTS

| | | | |
|---|---|---|---|
| 5,673,023 A * | 9/1997 | Smith | 340/571 |
| 5,945,918 A * | 8/1999 | McGonigal et al. | 340/825.36 |
| 6,166,652 A * | 12/2000 | Benvenuti | 340/825.49 |
| 6,407,779 B1 * | 6/2002 | Herz | 348/734 |
| 6,445,290 B1 * | 9/2002 | Fingal et al. | 340/539.32 |
| 6,573,832 B1 * | 6/2003 | Fugere-Ramirez | 340/539.13 |
| 6,879,254 B1 * | 4/2005 | Graham | 340/539.32 |

\* cited by examiner

*Primary Examiner*—Trang U Tran
(74) *Attorney, Agent, or Firm*—Venable LLP; Michael A. Gollin

(57) ABSTRACT

An embodiment of the present invention for the first time includes a television and a remote control for the television, with an activator installed in the television at the time of manufacture, and with a locator signal generator, which may be a beeper, a flashing light, or other device, installed in the remote control at the time of manufacture. Using the activator in the television will activate the locator signal generator in the remote control. The resulting signal, which may be a sound, or a flashing light, or both, or another signal, enables the user to locate the remote control. The activator wirelessly communicates to the signal generator to activate the signal generator.

12 Claims, 1 Drawing Sheet

EASY-TO-FIND REMOTE CONTROL FOR TELEVISION OR OTHER DEVICES

FIELD OF INVENTION

The field of this invention is television systems. More specifically, this invention involves televisions with remote controls.

DESCRIPTION OF THE PRIOR ART

Televisions with remote controls exist.

Beeper locator devices exist to locate items. Some of these devices have a hand held activator that activates the beeper by a wireless signal. The beeper locator device is attachable to an item that someone often loses and wants to find. The beeper is attachable to the item by an adhesive strip or velcro. The beeper is powered by its own internal battery. The beeper locator may be, for example, attached to keys, a mobile phone, or a television remote control. When the activator is activated, the beeper is made to beep, sending out an audio signal that is used to locate the lost item. To find the desired item by activating the beeper, one must first find the activator. The activator may be lost in the same manner as the desired item may be lost.

Wireless phones exist that use a handset that wirelessly communicates telephone calls to and from a docking station. The docking station is wired to the telephone land line system. Models of wireless phones exist with an activator button installed in the docking station. Pressing the activator button sends a signal to a beeper installed in the handset. Activating the beeper causes the beeper in the handset to send out an audio signal that can be followed to find the handset.

A problem that is not addressed by the prior art is the problem of finding a lost television remote control, without first finding a separate activator device (which in itself may also be lost), and without first attaching a beeper device to the outside of the remote control, after purchase.

Television remote controls are often lost in the room containing the television. The remote control may be lost under seat cushions, on the floor under furniture, under newspapers, under fluffy pet cats, or elsewhere. This can be a considerable irritant to the frustrated remote user.

SUMMARY

The summary and abstract herein are intended to describe some embodiments of the present invention. They do not encompass each and every embodiment, and may not encompass the full scope of the claims. The summary and abstract herein should not be construed as limiting the present invention or the claims.

An embodiment of the present invention for the first time includes a television and a remote control for the television, with an activator installed in the television at the time of manufacture, and with a locator signal generator, which may be a beeper, a flashing light, or other device, installed in the remote control at the time of manufacture. Using the activator in the television will activate the locator signal generator in the remote control. The resulting signal, which may be a sound, or a flashing light, or both, or another signal, enables the user to locate the remote control. The activator wirelessly communicates to the signal generator to activate the generator.

Other embodiments of the present invention may involve a locator signal generator installed in any remote control for any controlled device, with the activator for the locator signal generator being installed in the device controlled by the remote control, such as a radio, a CD player, a VCR player, a DVD player, a PC, a robot, a garage door, an appliance, or others.

The present invention has a competitive advantage in the marketplace over conventional televisions with conventional remote controls, because the present invention would for the first time offer a television with an unlosable, easy-to-find remote control. With the present invention, the user will never again be frustrated by the question, "Where is the remote?"

BRIEF DESCRIPTION OF EMBODIMENTS

Figure 1:
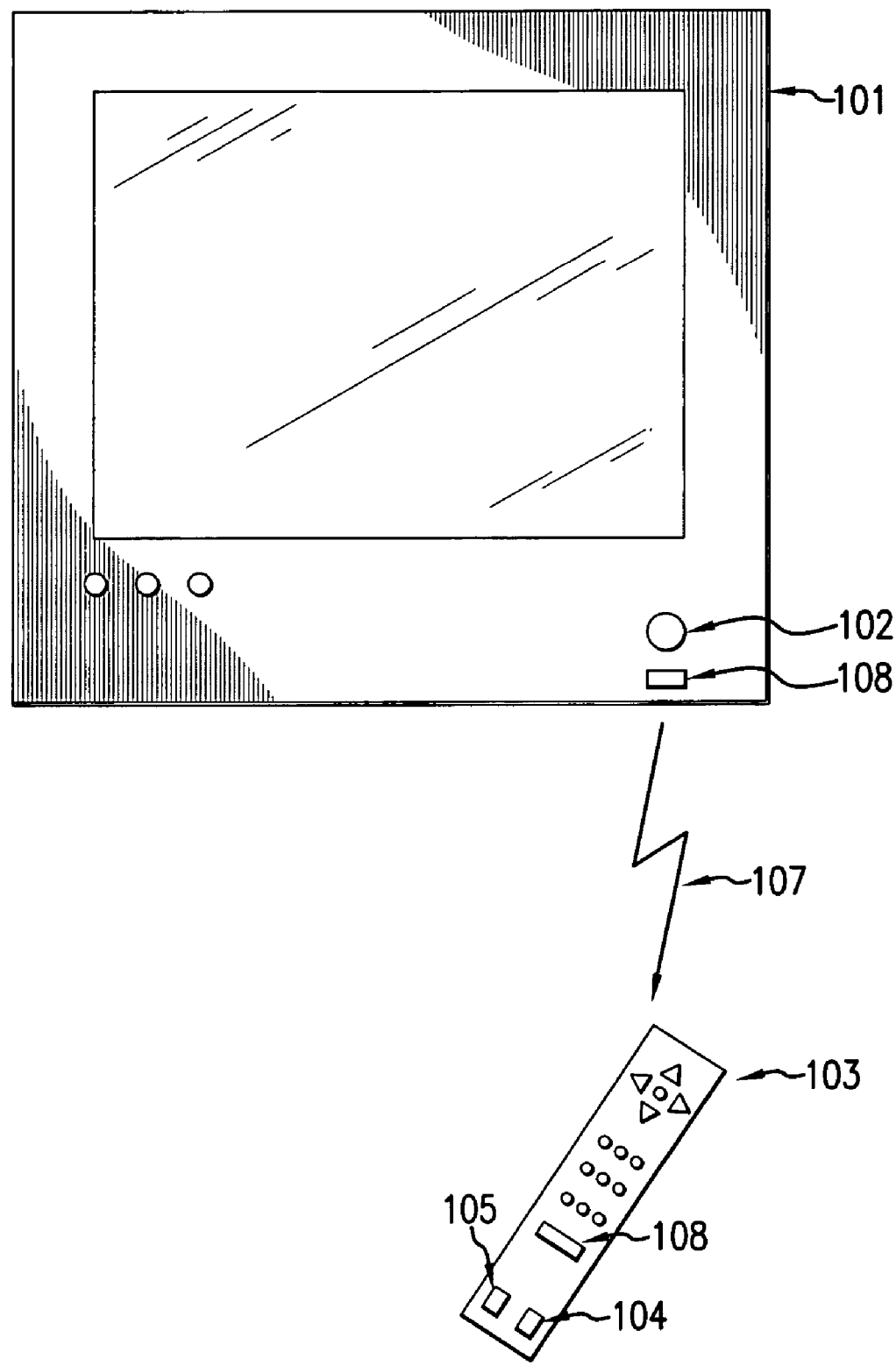
FIG. 1 shows an embodiment of the invention with a television 101, a remote control 103 for the television, and an activator 102 in the television for the locator signal generator 104, 105 in the remote control.

In one embodiment of the present invention, depicted in FIG. 1, the television 101 has installed within it an activator 102 for a remote control 103 for the television 101. Using the activator by pressing the activator button 102 causes a wireless signal 107 to be transmitted to the remote control 103 from the television 101. The remote control 103 contains a locator signal generator, which may be a sound generator 104, a blinking light 105 or both, or another signal generator.

The wireless signal 107 may be a low-energy short-range radio signal, an infrared light signal, a high frequency sound signal, or other wireless signal. The activator 102 may be powered by the same power source as the television 101, which may be powered by access to the electric power grid, or by an internal battery, or otherwise. The activator 102 may be configured to be always on, in the sense that it may always have power and be used at any time to find the remote, regardless of whether the television is on or off. Alternatively, the activator 102 may be powered and useable only when the television is on.

The locator signal generator 104, 105 may be powered from the power source of the remote control 103, preferably batteries.

In one embodiment, the remote control 103 will have both a sound generator 104 and light 105. In one embodiment, the user can select that either or both of the locator signal generators 104, 105 are to be used. The selection may be made by flipping a three-position indicator switch 108 on the remote 103 to select the sound generator 104, the light generator 105, or both sound 104 and light 105. The signal generator selector switch 108 may alternatively be installed on the television 101 rather than on the remote control 103. The signal generator selector switch 108 and the locator activator button 102 may be mechanical, electromechanical, solid state, heat sensitive, pressure sensitive, or otherwise.

One skilled in the art will appreciate that the present invention can be practiced by embodiments other than the described embodiments. The described embodiments are presented for purposes of illustration and not limitation, and the present invention is limited only by the claims that follow.

The invention claimed is:

1. A remote control system comprising:
   (a) a controlled electrical device;
   (b) an activator installed in the controlled electrical device;
   (c) a wireless remote control for the controlled electrical device;

(d) a location signal generator installed in the remote control, which signal generator is activated by receipt of a wireless signal from the activator in the controlled electrical device;

wherein the location signal generator is switchable between a flashing light, and a sound generator; and (e) a signal generator selection switch installed in the remote control, wherein the switch may be switched by the user to select from among the following three signal generator selection modes:

(i) sound only;
(ii) flashing light only; and
(iii) both sound and flashing light;

thereby changing the signal generator selection mode.

2. A remote control system comprising:
(a) a controlled electrical device;
(b) an activator installed in the controlled electrical device;
(c) a wireless remote control for the controlled electrical device;
(d) a location signal generator installed in the remote control, which signal generator is activated by receipt of a wireless signal in the controlled electrical device;
wherein the location signal generator is switchable between a flashing light, and a sound generator; and
(e) one or more signal generator selection switches installed in the controlled electrical device, and/or in the remote control, which switch may be switched by the user to select from among the following three signal generator selection modes:
(i) sound only;
(ii) flashing light only; and
(iii) both sound and flashing light;
thereby changing the signal generator selection mode.

3. The remote control system of claim 2, wherein the system comprises two signal generator selection switches, one installed in the remote control and one installed in the controlled electrical device, either of which switches may be switched by the user to select from among the following three signal generator selection modes:
(i) sound only;
(ii) flashing light only; and
(iii) both sound and flashing light;
thereby changing the signal generator selection mode.

4. A remote control system comprising:
(a) an electrical device selected from the group consisting of a radio, a personal computer, a robot, a garage door, and an MP3 player;
(b) an activator installed in the electrical device;
(c) a wireless remote control for the electrical device;
(d) a location signal generator installed in the remote control, which signal generator is activated by receipt of a wireless signal from the activator in the electrical device;
wherein the location signal generator is switchable between a flashing light, and a sound generator; and
(e) one or more signal generator selection switches installed in the remote control and/or in the electrical device, which switch may be switched by the user to select from among the following three signal generator selection modes:
(i) sound only;
(ii) flashing light only; and
(iii) both sound and flashing light;
thereby changing the signal generator selection mode.

5. The remote control system of claim 4, wherein the signal generator selection switch is installed in the remote control.

6. The remote control system of claim 4, wherein the electrical device is a radio.

7. The remote control system of claim 4, wherein the electrical device is a personal computer.

8. The remote control system of claim 4, wherein the electrical device is a robot.

9. The remote control system of claim 4, wherein the electrical device is a garage door.

10. The remote control system of claim 4, wherein the electrical device is an MP3 player.

11. A remote control system comprising:
(a) a wireless remote control for an electrical device;
(b) an activator;
(c) a location signal generator installed in the remote control, which signal generator is activated by receipt of a wireless signal from the activator;
wherein the location signal generator is switchable between a flashing light, and a sound generator; and
wherein the electrical device is one of the group comprising a radio, a personal computer, a robot, a garage door, and an MP3 player; and
(d) a signal generator selection switch installed in the remote control, which switch may be switched by the user to select from among the following three signal generator selection modes:
(i) sound only;
(ii) flashing light only; and
(iii) both sound and flashing light;
thereby changing the signal generator selection mode.

12. electrical device and activator comprising:
(a) an electrical device;
(b) an activator installed in the electrical device;
wherein the electrical device is adapted to be controlled by a remote control, and
wherein the activator is adapted to transmit a wireless signal to activate a location signal generator, and
wherein the electrical device is one of the group comprising a radio, a personal computer, a robot, a garage door, and an MP3 player; and
(c) a signal generator selection switch installed in the electrical device, which switch may be switched by the user to select from among the following three signal generator selection modes:
(i) sound only;
(ii) flashing light only ; and
(iii) both sound and flashing Light; thereby changing the signal generator selection mode.

* * * * *